Figure 1:
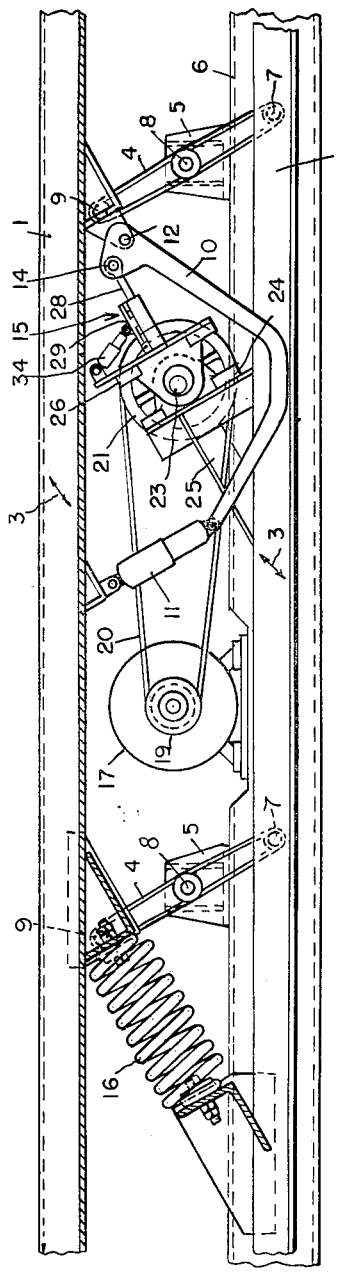

Feb. 6, 1962 R. M. CARRIER, JR 3,019,889
ENERGY TRANSMITTING MEANS FOR CONVEYORS AND THE LIKE
Filed Dec. 30, 1952 5 Sheets-Sheet 1

INVENTOR.
ROBERT M. CARRIER, JR
BY
Oberlin + Limbach
ATTORNEYS.

Feb. 6, 1962   R. M. CARRIER, JR   3,019,889
ENERGY TRANSMITTING MEANS FOR CONVEYORS AND THE LIKE
Filed Dec. 30, 1952   5 Sheets-Sheet 2
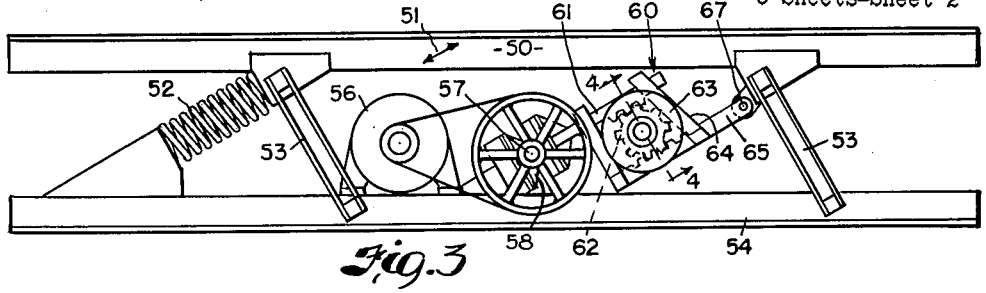
Fig.3
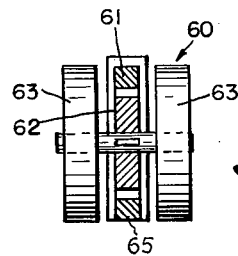
Fig.4   Fig.4a
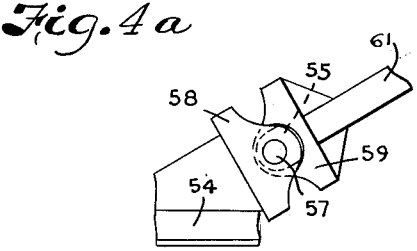
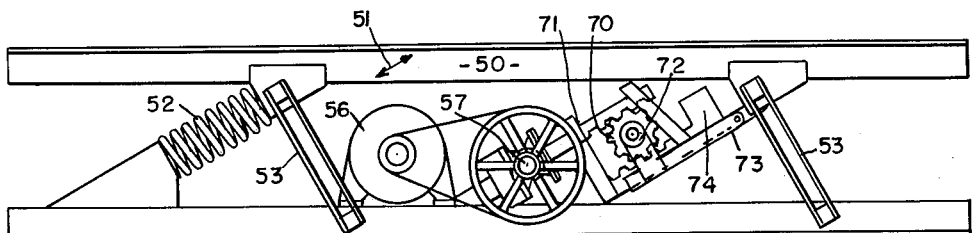
Fig.5
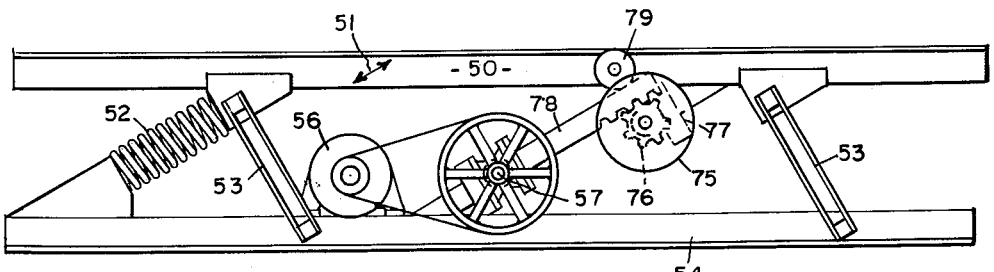
Fig.6
INVENTOR.
ROBERT M. CARRIER, JR.
BY
Oberlin + Limbach
ATTORNEYS.

Feb. 6, 1962 R. M. CARRIER, JR 3,019,889
ENERGY TRANSMITTING MEANS FOR CONVEYORS AND THE LIKE
Filed Dec. 30, 1952 5 Sheets-Sheet 3

INVENTOR.
ROBERT M. CARRIER, JR.
BY
Oberlin + Limbach
ATTORNEYS.

Feb. 6, 1962  R. M. CARRIER, JR  3,019,889
ENERGY TRANSMITTING MEANS FOR CONVEYORS AND THE LIKE
Filed Dec. 30, 1952  5 Sheets-Sheet 4

INVENTOR.
ROBERT M. CARRIER, JR.
BY
Oberlin + Limbach
ATTORNEYS.

Feb. 6, 1962     R. M. CARRIER, JR     3,019,889
ENERGY TRANSMITTING MEANS FOR CONVEYORS AND THE LIKE
Filed Dec. 30, 1952     5 Sheets—Sheet 5

INVENTOR.
ROBERT M. CARRIER, JR.
BY
Oberlin + Limbach
ATTORNEYS.

United States Patent Office 3,019,889
Patented Feb. 6, 1962

3,019,889
ENERGY TRANSMITTING MEANS FOR
CONVEYORS AND THE LIKE
Robert M. Carrier, Jr., Louisville, Ky., assignor, by mesne assignments, to Chain Belt Company, Milwaukee, Wis., a corporation of Wisconsin
Filed Dec. 30, 1952, Ser. No. 328,766
6 Claims. (Cl. 198—220)

The present invention relates generally as indicated to energy transmitting means for conveyors and the like and more particularly to energy transmitting means which afford a solution to the problems of imparting uniform amplitude vibration, under varied conditions of operation, to a vibrating system and of starting and stopping of the vibration of the vibrating system, which system in the case of conveyors includes a resiliently mounted member for supporting conveyable material thereon and adapted to be vibrated at natural frequency to convey the material therealong.

Hitherto, in vibrating conveyors and the like, the drive usually includes an eccentric shaft which produces a constant amplitude or stroke of its driving rod but the frequency or r.p.m. varies from zero to desired operating frequency during the starting thereof and vice versa in stopping thereof. Such a drive, if directly connected to a conveyor member, will assure constant stroke vibration of the latter regardless of the load of the conveyed material, but the entire horsepower required to vibrate said member and to convey the load must come from the drive whereby a large and heavy duty drive is required and severe stresses are transmitted to the eccentric shaft and driving rod bearings.

The foregoing conveyor with a positive drive is a so-called "brute-force" conveyor and the employment of springs between the driving rod and the conveyor member, or the employment of a magnetic vibrator drive or equivalent yieldable connection in the drive means, while reducing the stresses on the drive and conveyor, creates a different undesirable situation, namely, that the amplitude of vibration will dampen under heavy loads with consequent reduction of conveying speed and will increase to destructive proportions when the load is suddenly decreased or removed or when the conveyor is operated empty. Accordingly, if the drive is such as to prevent dampening under heavy loads then the conveyor becomes self-destructive when operated empty or under light load. Furthermore, in the case of direct positive drive of a resiliently supported conveyor, severe strains are imposed on the drive and the conveyor during starting and stopping because of the constant amplitude—varying frequency starting and stopping of the drive and the constant frequency—varying amplitude starting and stopping of the conveyor.

As aforesaid, the material supporting conveyor member is resiliently mounted for vibration at the natural frequency of the vibrating system, and in such a system, the starting and stopping of the vibration with the least effort and strain on the parts entails vibration of the conveyor member at the natural frequency of the system while gradually increasing or decreasing the amplitude of vibration. Accordingly, the starting and stopping of the drive means at constant stroke and changing frequency, and of the conveyor at constant frequency and changing stroke will result in severe strains on both the drive means and the conveyor unless the diametrically opposite conditions of starting and stopping are compensated for.

It is further desired to provide a drive for imparting uniform amplitude of vibration to prevent dampening of the conveyor under load or of vibrating at uncontrollable amplitude when operated empty or when the load is decreased or suddenly removed therefrom.

It is one object of the present invention to provide an energy transmitting means which is operative to cause vibration of a resiliently supported conveyor or the like at the natural frequency of the vibrating system and which is further operative to allow the drive to gradually and without excessive strain accelerate from zero frequency to such natural frequency and then commence to deliver energy impulses to the vibrating system in increments from zero to maximum amplitude, whereupon said energy transmitting means becomes substantially locked in to continue natural frequency and predetermined amplidude vibration of the system irrespective of the variation of the load of the conveyed material.

It is another object of this invention to provide an energy transmitting means which, in effect, becomes automatically disengaged when the power drive is de-energized whereby the drive may coast to a stop at constant amplitude and progressively decreasing frequency (r.p.m.) while the conveyor or vibrating system may coast to a stop at constant frequency and progressively decreasing amplitude. In this way, severe strains on the vibrating system and the drive are avoided in stopping of the vibration of the system.

It is another object of this invention to provide a new method of energy transmission control so as to avoid destructive forces on the drive and on the vibrating system incident to the starting and stopping of the same under diametrically opposite conditions as aforesaid.

It is another object of this invention to provide an energy transmitting means which, in one form thereof, constitutes a lost-motion connection between the drive and the vibrating system which lost-motion is progressively taken up after the drive approaches natural frequency speed to thereby progressively increase the amplitude of the system and which lost motion, upon de-energization of the drive, is effective to permit entirely independent coasting of the drive and system to a stop.

It is another object of this invention to provide an energy transmitting means which, in another form thereof, constitutes a mass which is oscillated, reciprocated, or otherwise moved in opposite directions by the drive until its inertia or momentum reaches a value to first impart progressively increasing amplitude vibration to the vibrating system and then to impart constant amplitude vibration in resonance with the natural frequency of the system, and which in the latter instance effectively locks the drive to the system while permitting the system to float and shift to different positions under varying load thereon, said means being further characterized in that during non-resonant operation of the drive as when the latter is de-energized, the decreasing amplitude vibration of the system is permitted by the setting up of the opposite direction movements of the mass.

Other objects and advantages of our invention will appear as the description proceeds.

To the accomplishment of the foregoing and related ends, said invention then comprises the features hereinafter fully described and particularly pointed out in the claims, the following description and the annexed drawings setting forth in detail several illustrative embodiments of the invention, these being indicative, however, of but a few of the various ways in which the principle of the invention may be employed.

Figure 2:
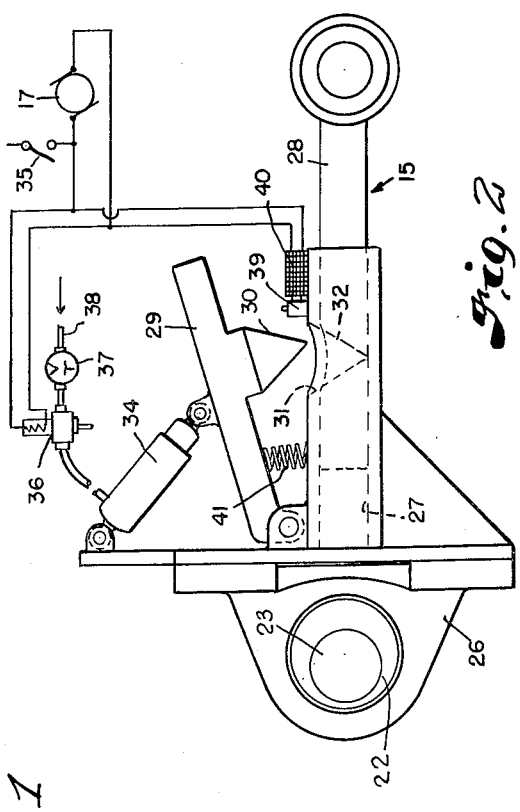
Figure 8:
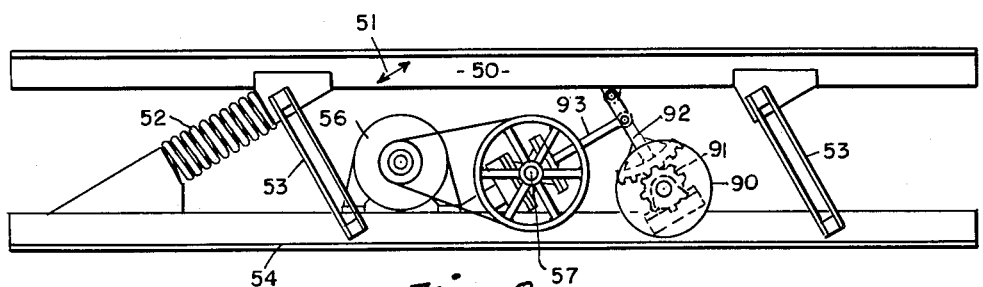
Figure 9:
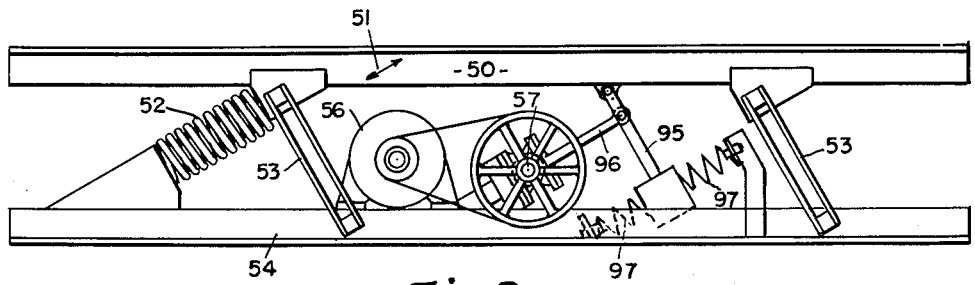
Figure 10:
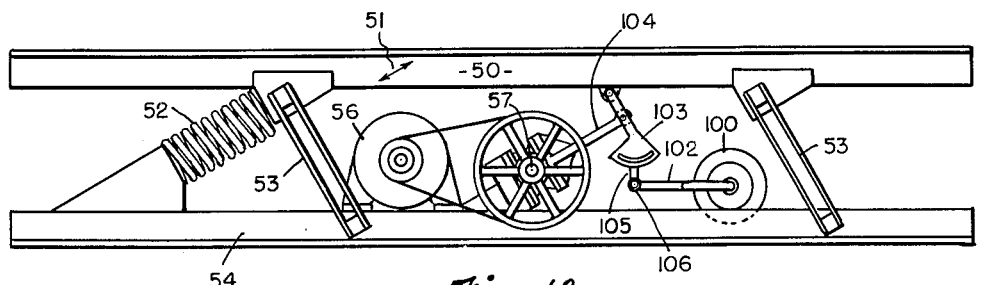
Figure 11:
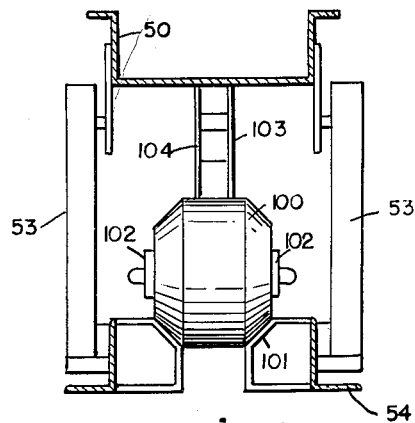
Figure 12:
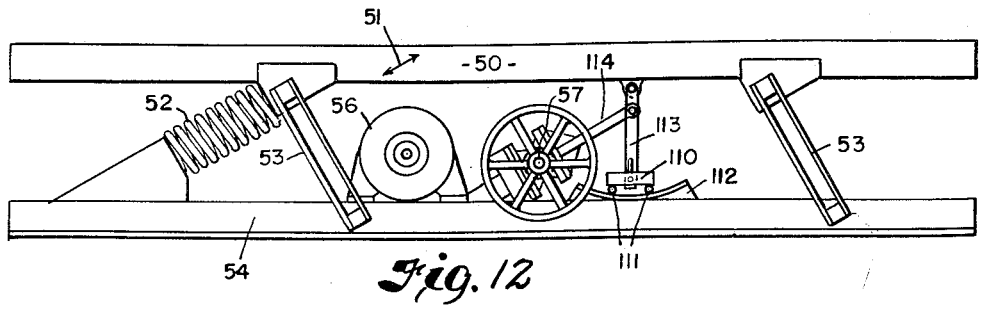
Figure 13:
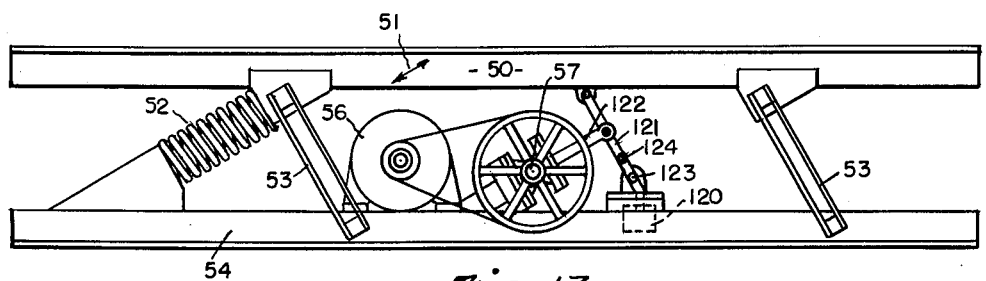
Figure 14:
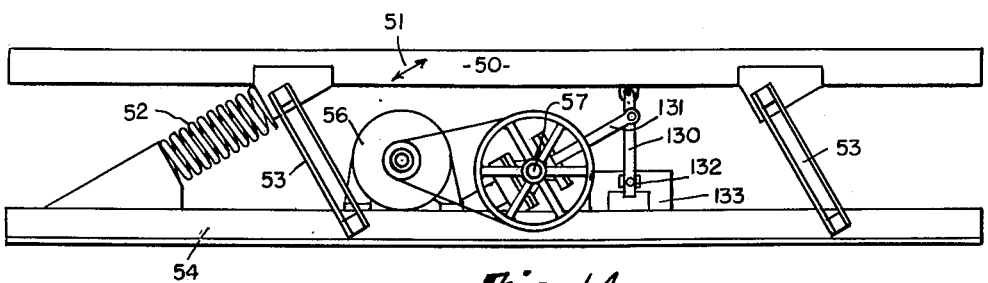
Figure 15:
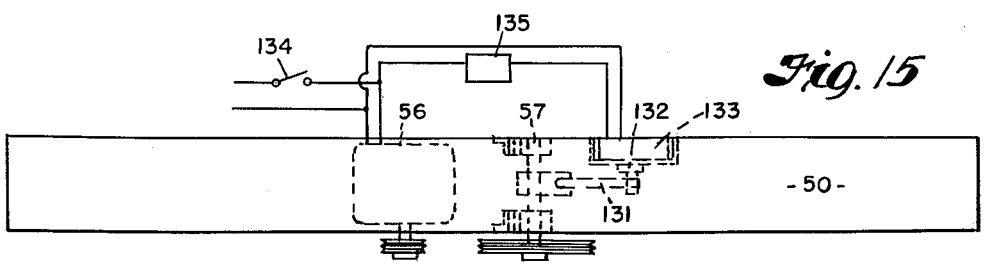

In said annexed drawings:

FIG. 1 is a side elevation view of a vibrating conveyor having one form of our energy transmitting means associated therewith;

FIG. 2 is an enlarged side elevation view of the energy transmitting means employed in the apparatus of FIG. 1, showing schematically the piping and wiring diagrams for effecting automatic operation of said energy transmitting means; and FIGS. 3, 5, 6, 7, 8, 9, 10, 12, 13, 14, and 16 are side elevation views of conveyors having different forms of energy transmitting means, FIG. 4 being a cross-section view taken substantially along the line 4—4 of FIG. 3, FIG. 4a being an elevation of an eccentric drive typical of those shown in FIGS. 3, 5, 6, 7, 8, 9, 10, 12, 13, 14 and 16 with the pulley for the driving belt removed to show structural details, FIG. 11 being an end elevation view as viewed from the right-hand end of FIG. 10, and FIG. 15 being a top plane view of the FIG. 14 conveyor.

Referring now more particularly to the drawings and first to FIGS. 1 and 2 thereof, there is shown therein a counterbalanced vibrating system comprising a conveyor trough 1 which is adapted to support conveyable material thereon. Said trough 1 and a counterbalancing member 2 parallel to said trough are supported for vibration in phase opposition along the inclined paths indicated by the lines 3 as by means of parallel arms 4 which are pivotally connected at their opposite ends to said trough 1 and said counterbalancing member 2 respectively and intermediate their ends to the brakets 5 of a base or frame structure 6. The pivots 7, 8, and 9 are preferably rubber bushed and in the event of shifting of the trough under varied load, less than about 20 percent of the desired amplitude of vibration of the conveyor trough 1, the rubber bushings in said pivots will accommodate such shifting as fully described in our co-pending application Serial No. 330,458, filed January 9, 1953, now Patent No. 2,797,796, issued July 2, 1957, whereby the energy transmitting means may have direct connection with the conveyor also through rubber bushings. In the event that the amount of such settling or shifting of the conveyor trough 1 under load of material thereon is more than indicated above, it will then be desirable to provide an arm 10 as shown in FIG. 1 which is pivotally connected at one end to said trough 1 and at the other end to one element of a hydraulic shock absorber 11 or equivalent device which device in turn has its other element pivotally connected to said trough. Offset from the pivot 12 between said arm 10 and said trough 1 and relatively close thereto as compared with the distance between the end pivots of said arm, said arm has pivotal connection at 14 with an energy transmitting unit 15 which will be fully described later.

The conveyor trough 1 is resiliently supported for vibration along the path 3 as by means of one or more coil springs 16 or the like which have their opposite ends secured to said trough 1 and to said base 6. When coil springs 16 are employed, the axes thereof will preferably be generally parallel to the path of vibration 3 of the conveyor trough 1 and of the counter-balancing member 2. As illustrated in the co-pending application of Robert M. Carrier, Jr., et al., Serial No. 136,794, now Patent No. 2,630,211, issued March 3, 1953, the conveyor trough 1 may be supported on parallel, obliquely disposed leaf springs or the like for vibration as indicated, one end of the leaf springs being secured to the trough and the other end being secured to a base structure.

The conveyor drive, including the energy transmitting unit 15 previously referred to, comprises an electric drive motor 17 or the like which may be mounted on the base 6 of the conveyor and which has a pulley 19 thereon for driving a belt 20 which belt in turn is trained over a pulley 21 of an eccentric drive shaft 23. Said shaft 23 is journalled for rotation in pillow blocks 24 secured to the brackets 25 on base 6. Journalled on the eccentric portion 22 of said shaft 23 is a drive member 26 which is provided with a bore 27 slidably receiving a driving rod 28 thus providing a lost-motion connection between said member 26 and said rod 28.

For effecting transmission of energy impulses of progressively increasing amplitude from the eccentric drive shaft 23 to the conveyor during starting of the conveyor vibration, there is pivotally mounted on the drive member 26 a lever 29 which has a wedge 30 thereon preferably of rubber or rubber-like material, which enters through an opening 31 in the wall of bore 27 and into a complementary recess 32 formed in said driving rod 28. It is therefore apparent that if the drive member is reciprocating, a gradual movement of the wedge 30 into the recess 32 will cause a gradual transmission of energy impulses to the conveyor trough 1 through the arm 10, the amplitude of such energy impulses gradually increasing from zero to the desired maximum which is reached when the wedge 30 is fully engaged. In this way, it is possible to allow the drive motor 17 and eccentric shaft 23 to be started under substantially no load up to the desired operating speed and then, by gradually engaging the wedge 30 as aforesaid, energy impulses in resonance with the natural frequency of the vibrating system and of progressively increasing amplitude will be transmitted to the vibrating system composed of the trough, the counterbalancing member 2 and the resilient supporting means 16.

It has been found that resonant vibration of the vibrating system can be effected with energy impulses which are of magnitude only about 10 percent of the energy impulses which would be required to vibrate the system at non-resonant frequency since the magnitude of the impulses need be only sufficient to overcome damping forces.

If the wedge 30 is disengaged from recess 32, motor 17 may be de-energized whereby the energy transmitting unit 15 permits independent coasting of the drive and vibrating system to a stop without inducing any severe strains which would otherwise occur if the system and the drive were rigidly connected together.

In order to effect a gradual engagement of said wedge 30 responsive to starting of the drive motor 17, there is connected to lever 29 and to said drive member 26 a pneumatic cylinder 34. Said cylinder 34 is extended by air pressure at a predetermined adjustable rate when the motor control switch 35 is closed because the closing of said switch 35 opens a solenoid-operated valve 36 to permit air to enter cylinder 34 at a rate as controlled by an adjustable throttling valve 37 in the air pressure supply line 38. A spring 41 bears on said lever 29 to yieldably oppose movement thereof into position fully engaging the wedge 30 in recess 32. As the wedge 30 approaches fully engaged position, the lever 29 closes a normally open switch 39 which energizes an electromagnet 40 to thus hold the lever 29 in engaged position. Now, as soon as the motor control switch 35 is opened, both the electromagnet 40 and the solenoid valve 36 are de-energized, the air in the cylinder 34 being exhausted whereby the spring 41 bearing on said lever 29 effects swinging of the latter to the disengaged position shown in FIG. 2.

With reference to the settling or shifting of the conveyor trough 1 on its spring mounting under varied loads, the hydraulic shock absorber 11 or equivalent device permits a gradual change in the relative positions of the pivots 12 and 14. Said shock absorber 11 is of a construction such that at the operating frequency of the conveyor, its length does not change, whereby there is, in effect, a positive driving connection of uniform amplitude from the driving rod 28 to the trough 1. However, said shock absorber 11 will slowly change in length in response to any slight change in load on the conveyor trough 1.

Having thus described one embodiment of the present invention, reference will now be made to other embodiments as illustrated in FIGS. 3 to 15.

In FIGS. 3 to 15 the particular vibrating systems illustrated each comprise a conveyor trough 50 resiliently supported for vibration along an inclined path 51 as by means of one or more coil springs 52 and parallel, oblique leaf springs 53 which have their opposite ends secured to said through 50 and to a base member 54. The axes of the coil springs 52 are preferably substantially parallel to the desired path of vibration 51 and the leaf springs 53 extend generally perpendicular to the axes of the coil springs 52 so as to also resiliently support the conveyor trough for vibration as aforesaid, said leaf springs 53 serving additionally as a guide. In each instance, the drive for the vibrating portion of the system comprises a drive motor 56 and eccentric drive shaft 57 driven by said motor.

In FIGS. 3 and 4, the drive motor 56 and shaft 57 are mounted on base 54 and the energy transmitting means 60 for effecting vibration of the conveyor trough 50 in resonance with the natural frequency of the vibrating system (the trough and the spring mounting therefor) comprises a connecting rod 61 reciprocated by means of said shaft 57, said rod being formed with a gear rack in mesh with the gear 62 of an inertia unit comprising fly wheels 63 non-rotatably secured to said gear. The connecting rod 61 is reciprocable in a bracket 64 which has a rod 65 pivotally connected at 67 to the conveyor trough 50, said rod 65 being formed with a gear rack in mesh with said gear 62.

FIG. 4a shows the means imparting reciprocal motion to connecting rod 61 as an eccentric 55 mounted on shaft 57 and journaled in bearing block 59 secured to the end of rod 61. Eccentric shaft 57 is supported for rotation in pillow blocks 58 mounted on base 54 and is driven by motor 56 through the coupling provided by the belt and pulley mounted on shaft 57 as shown in FIG. 3.

As previously mentioned, the conveyor or vibrating system can be vibrated in resonance with the natural frequency of the vibrating system with energy impulses which are but about 1/10 in magnitude as compared with the energy impulses otherwise required to vibrate the conveyor at non-resonant frequency. It has been discovered that the conveyed load has no appreciable effect on the period of vibration of the system but it is necessary to control the amplitude of vibration under different load conditions so that the conveyor will not dampen under heavy loads or so that the conveyor amplitude will not reach destructive proportions when the conveyor is operated under light load or empty.

The structures illustrated herein provide for resonant and substantially uniform amplitude vibration of the conveyor under all conditions of load and yet allow more or less independent coasting of the drive and of the vibrating system and also more or less independent starting of the drive which has a uniform stroke but varying frequency during starting whereas the conveyor is best started with least energy by impulses at natural frequency and progressively increasing amplitude.

As an example, let us assume that the conveyor or vibrating system is to be vibrated at an amplitude of one inch and that the system has a natural frequency of 500 cycles per minute. In the apparatus illustrated in FIGS. 3 and 4 when the drive motor 56 is first started, the rack on the connecting rod 61 will reciprocate through a constant stroke but at progressively increasing frequency and so long as the frequency is below the natural frequency of the system, the conveyor trough 50 will resist movement to an extent that the gear 62 and attached fly wheels 63 will be oscillated back and forth relative to the connecting rods 61 and 65. As the cycles per minute of the drive shaft 57 and connecting rod 61 increase, the fly wheels 63 oscillate faster and faster and correspondingly the inertia of said fly wheels becomes greater at the reverse points whereby increasing amplitude is transmitted to the conveyor trough 50. Finally, at 500 cycles per minute, which is the natural frequency of the system, the inertia or torque of said fly wheels 63 is a maximum. Therefore, since the resistance of the trough 50 or vibrating system is reduced 10 to 1 as the connecting rod 61 reciprocates at 500 cycles per minute, the fly wheel torque is so great that the fly wheels 63 become substantially stationary and the full one-inch stroke of the connecting rod 61 is transmitted through the gear 62 to the rod 65 whereby the conveyor trough 50 is vibrated through a one-inch stroke at natural frequency. When the electric power is cut off from the drive motor 56, the drive shaft 57 begins to slow down; and, when the speed thereof is somewhat less than 500 cycles or revolutions per minute, the torque immediately goes up 10 times and the fly wheels 63 begin to oscillate more and more thereby allowing the stroke of the trough 50 to become progressively less and less.

With reference to change in conveyed load during natural frequency vibration of the system, such change will cause the trough 50 either to be raised by the springs 52 and 53 or else said springs will allow the trough 50 to settle thereon, such raising or settling being permitted by rotation of the fly wheels 63 to a new relative position at which new position, the fly wheels will again be stationary to effect transmission of the one-inch stroke of the connecting rod 61 to the trough through the inertia unit and the rod 65 reciprocated thereby.

In the conveyor structure illustrated in FIG. 5, the gear 70 in mesh with connecting rod 71 and journalled on bracket 72 of connecting rod 73 throws a sliding weight 74 back and forth on rod 73 instead of revolving fly wheels as in FIG. 3. The sliding weight 74 has an advantage in that it is made to move opposite to the direction in which it is thrown thereby making a given mass more effective. Here again, when the drive shaft 57 is first started, the gear 70 oscillates back and forth about its axis and causes reciprocation of the sliding weight without transmitting appreciable energy impulses to rod 73 until finally when said shaft 57 is operating at a speed corresponding to the natural frequency of the system, the inertia of the sliding weight 74 is so great that the trough 50 is vibrated at natural frequency and at a predetermined uniform amplitude, the weight 74 then being substantially motionless relative to the gear 70; in other words, there is then what amounts to a direct connection between the drive shaft 57 and the conveyor trough 50. As in the FIG. 3 structure, when the power is cut off from the drive shaft 57, the same will rotate at progressively reducing speed and the amplitude of vibration of the trough 50 will become progressively less causing the sliding weight 74 to move more and more relative to the gear 70.

In the structure illustrated in FIG. 6, a fly wheel 75 and gear 76 are journalled on a bracket 77 of the trough 50, said gear being in mesh with connecting rod 78 thereby reducing the two rods 61 and 65 shown in FIG. 3 for example to one eliminating the trough connecting rod 65. In this structure, the trough 50 is provided with a guide roller 79 for the rod 78 and again starting and stopping of the vibration of the conveyor occurs without inducing any severe strains either on the trough 50 or on the driving mechanism since the amount of strain is limited by the inertia which is built up in the oscillating fly wheel 77 during oscillation thereof when the drive and system are operating in non-resonance as during starting and stopping.

Figure 7:
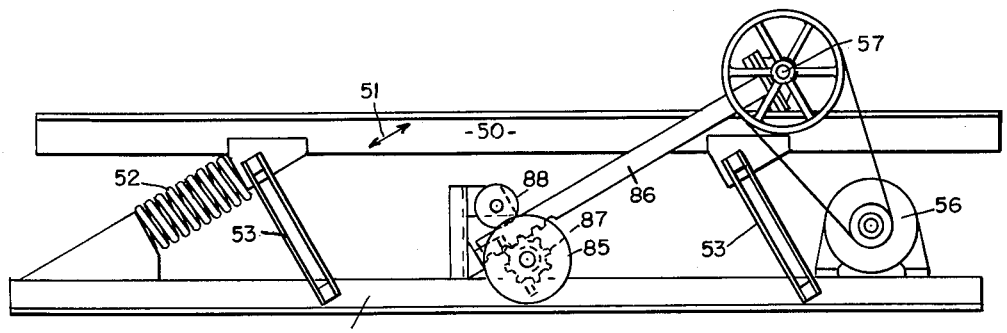

The structure illustrated in FIG. 7 is the reverse of that illustrated in FIG. 6 in that the eccentric drive shaft 57 is journalled on the conveyor trough 50 and the fly wheel 85 is journalled on the base 54. In this construction, which operates on the same principle as the others illustrated in FIGS. 3 to 6, any oscillation of the fly wheel 85 will provide a visual indication that the system is not being operated at natural frequency. The connecting rod 86 meshes with the gear 87 of said fly wheel 85 and is guided by roller 88.

In the construction illustrated in FIG. 8, a fly wheel 90 is journalled on the base 54 of the conveyor and in mesh with the gear 91 thereof is a gear segment 92 which is pivotally connected to the conveyor trough 50 and to the connecting rod 93 of the eccentric drive. This construction operates in substantially the same way as the FIG. 3 construction except that increased leverage is obtained for heavy duty conveyors. Moreover, the weight of the fly wheel 90 is on a stationary base 54 and therefore provides a visual indication of whether or not the fly wheel 90 is moving and thus indicating that the conveyor is operating at natural frequency when said fly wheel is stationary. As before, the fly wheel 90 becomes stationary or substantially stationary at natural frequency whereby the gear segment 92 rocks upon the then stationary gear 91 whereby energy impulses are transmitted by connecting rod 93 to the gear segment 92 and to the conveyor trough 50. Also, the conveyor trough 50 is capable of shifting on its spring mounting in accordance with the conveyed load thereon.

In FIG. 9, the inertia build up of a mass is obtained by pivotally connecting a weighted lever 95 to the conveyor trough 50 and causing said lever to swing back and forth by pivotally connecting the eccentric driven connecting rod 96 thereto. In one actual construction, the lever arm ratio between the weight and its pivotal connection to trough 50 and between the pivots, that is the trough and rod connections to lever 95, was 10 to 1 whereby with a one-inch stroke of the drive shaft and connecting rod, the weight was swung through a 10-inch arc until the drive shaft 57 approached the natural frequency of the system which was 500 cycles per minute. As the revolutions per minute of shaft 57 approached natural frequency, the weight was caused to make a progressively smaller stroke until it was moving in phase with the conveyor trough 50. However, when the drive shaft 57 and rod 96 are operating slightly under natural frequency, the weight on lever 95 makes slightly more than a one-inch stroke. When the drive shaft speed coincides with the natural frequency of the system, the weight is stationary. If the speed of the drive shaft 57 is increased 5 or 10 percent, for example, so that its r.p.m. is greater than the natural frequency of the system, the conveyor trough 50 tends to make an overstroke which results in the weight moving 180° out of phase to the trough, its stroke being a combination of the stroke of the trough 50 less the amount of overstroke. Thus, if the weight is moving in phase with the trough but appears to be making a longer stroke, the operator of the conveyor is immediately advised that the drive mechanism is operating at less than desired natural frequency, and therefore, he may increase the speed of the drive shaft 57 until the stroke of the weight stops. On the other hand, if the weight is moving 180° out of phase with the trough 50, the operator is immediately apprised of the fact that the drive mechanism is operating at a frequency greater than the natural frequency of the system. Here again, the operator may reduce the speed of the drive mechanism until the weight stops moving.

The conveyor illustrated in FIG. 9 in addition to enabling the operator to quickly and easily maintain operation in natural frequency, has two other distinct advantages, one being that this structure accomplishes the desired purpose of enabling starting and stopping of the conveyor in the desired manner; and the other being that the energy transmitting means including the swinging weighted lever 95 automatically allows the conveyor to center itself in order to accommodate different conveyed loads without transmitting the centering load back to the bearings of the eccentric drive shaft 57. The weight as will be observed, has a relatively wide range of centering so that normally no hand adjustment is required as is sometimes required in connection with conveyors which have hydraulic shock absorbers 11 or the like for enabling settling.

With further reference to FIG. 9, the weight may be supplemented by springs 97 or said springs 97 may be used in lieu of the weight.

When employing a 10 to 1 leverage as indicated, the weight should be approximately 18 pounds per horsepower of drive.

In FIGS. 10 and 11, the inertia member constitutes a relatively heavy wheel 100 which rides on a track 101 in the conveyor base 54, said wheel 100 being rolled on said track 101 by means of the forked lever 102 pivotally connected to the center of said wheel at its forked end and pivotally connected to an arm 103 at the other end, said arm 103 in turn being pivotally connected to the conveyor trough 50 and also to the reciprocating connecting rod 104 of the eccentric drive mechanism. Said arm 103 constitutes a centering device which includes an adjusting link 105 to make possible, if required, adjustment caused by any permanent centering of the conveyor. The conveyor illustrated in FIGS. 10 and 11 operates on the same general principle as the conveyors previously described and therefore repetition is not required. Here again, the rolling weight 100 is associated with the stationary member of the conveyor, that is, the base 54 whereby at natural frequency operation of the system, said weight 100 will be stationary owing to the reduced energy impulses required for maintaining natural frequency vibration of the system; and, of course, at such natural frequency operation, the reciprocation of the connecting rod 104 is transmitted to the conveyor trough 50 through the arm 103, the pivot 106 in effect being fixed at natural frequency, but being movable to allow settling of the conveyor trough 50 under varied loads. The inertia of the rolling weight 100 prevents uncontrollable amplitude vibration of the conveyor trough when the conveyor is operated empty or under light loads and likewise, the conveyor is prevented from dampening under heavy load.

In the construction illustrated in FIG. 12, a weight 110 is provided with rollers 111 which run on a curved track 112 and when the drive motor 56 is started, lever 113 which longitudinally slidably and pivotally extends through said weight 110, will be swung back and forth by the eccentric driven rod 114 without transmitting appreciable energy impulses to the conveyor trough 50; and, of course, as the drive shaft 57 speed approaches natural frequency, the inertia of the swinging weight 110 becomes so great that the reduced energy impulses required for vibration of the system are transmitted to the conveyor trough 50 and the weight 110 becomes stationary with respect to the conveyor trough 50. No centering device is shown in FIG. 12 but obviously, one may be provided if necessary.

In FIG. 13, there is shown a conveyor in which the energy transmitting means employs a compound leverage system including weighted lever 120 pivotally mounted between its ends to base 54 and a lever 121 pivoted on trough 50 and said lever 120 at its opposite ends and on the eccentric driven rod 122 between its ends. With this form of energy transmitting means, it is possible to reduce the mass of the weight required for higher horsepower drives. Thus, during starting of the conveyor drive shaft 57, the lever 121 will swing back and forth causing swinging back and forth of the weighted lever 120 about the pivot 123 which is stationary with respect to base 54. Then, as the eccentric drive shaft 57 picks up speed approaching the natural frequency of the system, the inertia of the weight is so great that the reduced energy impulses required for natural frequency vibration of the system causes the weighted lever 120 to become stationary or practically so, whereby the lever 121 will then swing about the pivot 124 to cause uniform amplitude vibration of the conveyor trough 50. Similarly, when the power from the eccentric drive shaft 57 is cut off, the drive and the conveyor may more or less independently coast to a stop with the weight lever 120 being progressively swung an increasing amount about the pivot 123.

In FIGS. 14 and 15, a lever 130 is pivotally connected to the conveyor trough 50 and swinging thereof is effected by the reciprocation of the eccentric driven connecting rod 131. The end of said lever 130 is provided with a plunger 132 which swings past an electromagnet 133 and obviously, when said electromagnet is de-energized, there is no appreciable load resisting swinging of said lever 130; and, therefore, the lever 130 may be swung by eccentric driven rod 131 without transmitting any appreciable energy impulses to the conveyor trough 50. There is provided in association with the motor starting switch 134 a time delay relay 135 or equivalent device which, say 5 or 10 seconds after starting of the drive motor 56, gradually energizes the electromagnet 133 through a potentiometer or the like thereby drawing the plunger 132 thereagainst with increasing force and effectively adding more and more resistance or load to the end of said lever 130. Thus, with the drive shaft 57 and rod 131 operating the natural frequency, the amplitude of vibration of the conveyor trough 50 is progressively increased until finally the lower end of said lever 130 becomes more or less a fixed pivot. The plunger 132 on the end of said lever 130 has sufficient sliding properties against electromagnet 133 to allow the conveyor trough 50 to settle under load and to maintain a centered position of the lever; and also, any movement of the lower end of said lever during operation of the conveyor trough 50 will reveal to the operator that the drive and vibrating system are non-resonant.

While the apparatuses here shown to be vibrated are in the form of horizontal conveyor troughs, it will be apparent to those skilled in the art that the principles of the energy transmitting means herein disclosed may be applied to vertical spiral conveyors as well as to any of a variety of different kinds of machines wherein it is desired to vibrate a member in resonance with the natural frequency of the vibrating system of which said member is a part and to vibrate said member at uniform amplitude while enabling starting and stopping of the drive at constant stroke but varying frequency and starting and stopping of the member at constant frequency but varying amplitude so as to greatly reduce the stresses on the drive and on the vibrating system and further to maintain uniform amplitude resonant vibration of the member under varying loads on said member.

Figure 16:
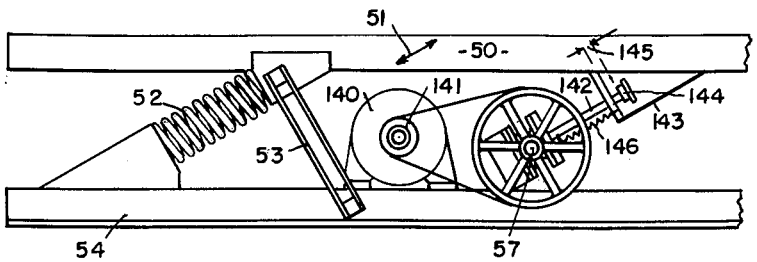

The conveyor illustrated in FIG. 16 is generally the same as the conveyors illustrated in the preceding figures except that the drive mechanism has been modified to impart unidirectional energy impulses to the conveyor trough 50. In this case, the drive motor 140 which is mounted on the base 54 of the conveyor has associated therewith a hydraulic, centrifugal, or like clutch (not shown) which will cause the pulley 141 to be driven only when the drive shaft speed has reached a predetermined value, for example, 1700 r.p.m. When such clutch is engaged, the eccentric shaft 57 will be driven at the proper speed corresponding to the natural frequency of the spring mounted conveyor pan 50. The connecting arm 142 which is actuated by the eccentric shaft 57 extends through an opening in the bracket 143 attached to the conveyor pan 50 and has an enlarged head 144 thereon which may be of metal or any other material but is preferably of rubber or rubber-like material to act as a buffer and thereby reduce shock while yet providing substantially positive driving. When the conveyor pan 50 is at rest, the clearance 145 between bracket 143 and the head 144 is substantially one-half the stroke of the arm 142. When the conveyor is first started, the motor 140 will reach the desired operating speed under no load and then, when the clutch therein is engaged, the arm 142 will be reciprocated at natural frequency, the first half of the first stroke taking up the clearance 145. During the second half of the initial stroke of said arm, the springs 52 and 53 will be compressed and deformed to store up energy for the working stroke. On the reverse stroke, the head 144 and the bracket 143 will move substantially in unison because the arm 142 is operated at the natural frequency of the spring supported conveyor pan 50. In order to restore the parts to the position shown in FIG. 16, when said motor 140 is de-energized (and the clutch therein disengaged by deceleration of said motor), a spring 146 is provided, said spring being connected in tension between the arm 142 and the bracket 143.

It is to be noted that in the FIG. 16 structure there is provided the desired features of the invention, that is, the starting of the vibration of the conveyor at natural frequency without high starting loads on the drive motor, and the independent coasting of the conveyor and drive motor to a stop. An additional feature of the FIG. 16 structure is that, even though positive driving of the conveyor is effected in one direction only, no uncontrollable overstroking at the upper end of the conveyor stroke is possible beacuse any such overstroking will be arrested by the engagement of the bracket 143 with the head 144. This conveyor, as all of the others, is capable of settling under varied load of material thereon and such settling merely changes the distance 145 whereby the stroke of the conveyor pan may in some instances be slightly reduced out, nevertheless, energy impulses will be imparted to the conveyor pan 50 on the downstroke of the latter so long as the amount of such settling is less than the entire stroke of the connecting arm 142. In actual structures, the amount of settling between the unloaded and the fully loaded conditions of the conveyor is usually less than 20% of the stroke of the eccentric.

Other modes of applying the principle of the invention may be employed, change being made as regards the details described, provided the features stated in any of the following claims, or the equivalent of such, be employed.

We therefore particularly point out and distinctly claim as our invention:

1. In combination, a base, a member moveable with respect to said base, a support structure for said member, a resilient element cooperating with said member and said support structure to establish an equilibrium position for said member, said member, structure and element having a resonant frequency of vibration with respect to said base, a drive having a fixed amplitude of motion, a variable frequency of motion in starting and stopping and an operating frequency of motion essentially corresponding to said resonant frequency, a lever coupling said drive and said member, a first pivotal connection between said drive and said lever, a second pivotal connection between said lever and said member, a point on said lever spaced from said pivots, and inertia means connected to said point on said lever and having sufficient mass to inhibit motion of said lever at said point to an amplitude generally equal to the motion of said member attached to said lever at said second pivotal connection.

2. In combination, a base, a member moveable with respect to said base, a support structure for said member for supporting it with respect to said base, a resilient element included in said support structure, said member and support structure having a resonant frequency of oscillation with respect to said base and a variable amplitude of oscillation, a reciprocating drive for said member having a fixed amplitude of reciprocation and a variable frequency of reciprocation, a lever pivotally connected to said member at a first point, a pivotal connection between said lever and said reciprocating drive at a second point spaced along the length of the lever from said first point and horizontally displaced therefrom, a third point on said lever spaced along its length from said first and second points, elastic means connected between the third point and the base tending to inhibit motion of said lever at said third point, said elastic means accommodating a motion of said third point that is several times the stroke of said reciprocating drive and having a stiffness sufficient to inhibit motion of said lever at said third point when operated at said resonant frequency, and means to reciprocate said drive at a frequency essentially corresponding to the resonant frequency of oscillation whereby the reciprocation of said second pivot point on said lever at other than the resonant frequency tends to oscillate said third point to a greater extent and said first point to a lesser extent than at the resonant frequency.

3. In an apparatus for doing work by vibration; in combination; a work member of substantial mass to be vibrated along a generally linear work path at an operating speed, a base member, resilient means supporting the work member from the base member and cooperating with the members to form a vibratory system that is substantially in resonance at the operating speed, a positive amplitude drive mechanism mounted on the base member for operation at said operating speed, and connecting means from the drive mechanism to the work member for transmitting force from the drive mechanism to the work member, said connecting means including a lever having a first point pivotally connected to the work member, a spring connected between a second point of the lever and the base member and arranged to resist movement of the lever in either direction from an initial position through an operating range that is large compared to the stroke of said drive mechanism, and a third point of the lever pivotally connected to said drive mechanism, said spring serving to substantially arrest movement of said second point during operation at the resonant frequency of the vibrating system, whereby said spring limits the force transmission to the work member during starting and stopping of the drive mechanism and serves as a fulcrum for the lever when the force of the resilient means matches the acceleration forces of the work member at the operating speed.

4. In an apparatus for doing work by vibration, in combination, a work member of substantial mass to be vibrated along a generally linear path at an operating speed, a base member, resilient means supporting said work member from the base member and cooperating with the members to form a vibratory system having a resonant frequency, a positive stroke vibration exciter mounted on the base member and operated substantially at said resonant frequency, and a differential drive mechanism connecting the exciter to the work member, said differential drive comprising a lever pivotally connected to the work member and extending generally normal to said linear path, means connecting the exciter to a second point of the lever, and a spring connected between a third point of the lever and a fixed support and arranged to resiliently oppose motion of said third point, said spring being adapted to yield through a stroke large compared to the stroke of the exciter during non-resonant operation and substantially arrest motion of said point during resonant operation, whereby said spring limits the transmission of force to the work member during starting and stopping of the vibration exciter and said lever cooperates with said exciter to limit the maximum amplitude of vibration of the work member.

5. In a structure according to claim 4, a mass attached to said lever adjacent said third point thereof.

6. In an apparatus for doing work by vibration; in combination; a work member of substantial mass to be vibrated along a generally linear work path at an operating speed, a base member, resilient means supporting the work member from the base member and cooperating with the members to form a vibratory system having a resonant frequency, a positive stroke vibration exciter mounted on the base member and operated substantially at said resonant frequency, and a differential drive mechanism connecting the exciter to the work member, said differential drive comprising a lever pivotally connected to the work member and extending generally normal to said linear path, means connecting the exciter to a second point of the lever, and a mass connected to a third point of the lever to oppose motion of said third point, said mass having only sufficient inertia to substantially arrest movement of said third point during operation at the resonant frequency of said vibratory system, whereby said mass limits the transmission of force to the work member during starting and stopping of the vibration exciter and said lever cooperating with the fixed stroke of said exciter limits the maximum amplitude of vibration of the work member.

References Cited in the file of this patent

UNITED STATES PATENTS

| 786,337 | Zimmer | Apr. 4, 1905 |
| 1,386,158 | Candlot | Aug. 2, 1921 |
| 1,810,882 | Heymann et al. | June 16, 1931 |
| 2,358,876 | Overstron | Sept. 26, 1944 |
| 2,447,393 | Campion | Aug. 17, 1948 |
| 2,630,211 | Carrier et al. | Mar. 3, 1953 |
| 2,725,984 | Klemencic | Dec. 6, 1955 |

FOREIGN PATENTS

| 338,023 | Germany | June 11, 1921 |
| 485,982 | Germany | Nov. 7, 1929 |